US008392028B2

(12) United States Patent
Lange et al.

(10) Patent No.: US 8,392,028 B2
(45) Date of Patent: Mar. 5, 2013

(54) DISTRIBUTED MONITORING AND CONTROL FLUID HANDLING SYSTEM

(75) Inventors: Christopher M. Lange, New Brighton, MN (US); William C Scherer, Coon Rapids, MN (US); Fred A Sutter, Arden Hills, MN (US); Greg T. Mrozek, Brooklyn Park, MN (US); Gary S. Parnes, Plymouth, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 107 days.

(21) Appl. No.: 12/600,789

(22) PCT Filed: Jun. 3, 2008

(86) PCT No.: PCT/US2008/065605
§ 371 (c)(1),
(2), (4) Date: Nov. 18, 2009

(87) PCT Pub. No.: WO2008/151174
PCT Pub. Date: Dec. 11, 2008

(65) Prior Publication Data
US 2010/0161138 A1 Jun. 24, 2010

Related U.S. Application Data

(60) Provisional application No. 60/941,820, filed on Jun. 4, 2007.

(51) Int. Cl.
*G05D 11/00* (2006.01)
(52) U.S. Cl. .......................... 700/282; 700/281; 702/100
(58) Field of Classification Search .................. 700/266, 700/281, 282, 285; 702/100
See application file for complete search history.

(56) References Cited

U.S. PATENT DOCUMENTS

| | | | |
|---|---|---|---|
| 5,203,366 A | 4/1993 | Czeck et al. | |
| 5,541,810 A | 7/1996 | Donhauser et al. | |
| 5,706,273 A * | 1/1998 | Guerreri | 700/283 |
| 5,735,213 A | 4/1998 | Bury | |
| 5,988,860 A * | 11/1999 | Hefferen et al. | 700/276 |
| 6,008,985 A | 12/1999 | Lake et al. | |
| 6,418,027 B1 | 7/2002 | Suzuki et al. | |
| 6,475,180 B2 * | 11/2002 | Peterson et al. | 604/65 |
| 6,489,168 B1 * | 12/2002 | Wang et al. | 436/37 |
| 6,574,681 B1 * | 6/2003 | White et al. | 710/15 |
| 6,721,630 B1 * | 4/2004 | Woytowitz | 700/284 |
| 6,727,096 B1 * | 4/2004 | Wang et al. | 436/37 |
| 6,802,737 B2 | 10/2004 | Bergner et al. | |
| 6,842,667 B2 | 1/2005 | Beutler | |
| 6,973,373 B2 * | 12/2005 | Gray et al. | 700/282 |
| 6,990,393 B2 | 1/2006 | Parker | |
| 7,173,817 B2 | 2/2007 | Wei | |
| 7,643,909 B2 * | 1/2010 | Goldman et al. | 700/282 |

(Continued)

*Primary Examiner* — Mohammad Ali
*Assistant Examiner* — Anthony Whittington
(74) *Attorney, Agent, or Firm* — Douglas B. Farrow

(57) ABSTRACT

A fluid handling control/monitoring system is divided into a network of modular, intelligent components. These individual components are generally specific to a certain function within the system and contain all the intelligence necessary to perform that function without external guidance. Examples of the different types of components include but are not limited to: human-machine interface (HMI), fluid control, heater control, motor control, field-bus communications and the like. While each type of board is specialized in function, it may control several items of the same nature. For instance, a heater control may be able to control several heaters on one system. Similarly, a fluid board may have the ability to receive input from more than one flow meter and then control fluid flow of more than one point. An example might be a plural component metering and dispensing system where two fluid components have to be combined in a precise mix ratio.

11 Claims, 4 Drawing Sheets

U.S. PATENT DOCUMENTS

| | | | |
|---|---|---|---|
| 7,720,574 B1* | 5/2010 | Roys | 700/282 |
| 2003/0078751 A1* | 4/2003 | Juhasz | 702/114 |
| 2003/0235042 A1 | 12/2003 | Harris et al. | |
| 2005/0068716 A1* | 3/2005 | Pereira | 361/624 |
| 2007/0156288 A1* | 7/2007 | Wroblewski et al. | 700/266 |
| 2011/0231024 A1* | 9/2011 | Medizade | 700/282 |

* cited by examiner

DISTRIBUTED MONITORING AND CONTROL FLUID HANDLING SYSTEM

This application claims the benefit of U.S. Application Ser. No. 60/941,820, filed on Jun. 4, 2007, the contents of which are hereby incorporated by reference.

TECHNICAL FIELD

1. Background Art

Traditional fluid handling systems have utilized purpose-built controllers for each product which in turn required a substantial amount of engineering, even for similar products.

2. Disclosure of the Invention

The instant invention aims to divide a fluid handling control system into a network of modular, intelligent components in order to improve system performance (e.g. capability, flexibility, reliability, maintenance) and to reduce long-term development effort.

A fluid handling control/monitoring system is divided into a network of modular, intelligent components. These individual components are generally specific to a certain function within the system and contain all the intelligence necessary to perform that function without external guidance. Examples of the different types of components include but are not limited to: human-machine interface (HMI), fluid control, heater control, motor control, field-bus communications and the like. While each type of board is specialized in function, it may control several items of the same nature. For instance, a heater control may be able to control several heaters on one system. Similarly, a fluid board may have the ability to receive input from more than one flow meter and then control fluid flow of more than one point. An example might be a plural component metering and dispensing system where two fluid components have to be combined in a precise mix ratio.

Thus, all of the high speed control takes place on the board and only lower speed functions are performed over the network. In such a plural component system, the operator might set a desired mix ratio (2:1, etc.) on the HMI module. The actual control is "owned" by the fluid module so the fluid module would take the desired ratio set point and attempt to control the actual ratio to the desired result. The fluid module might have a number of other variables which it owns as well such as the flow rate of component A, flow rate of component B and potentially other useful pieces of data. One or more of those variables can be broadcast for use by other modules in the network but such broadcasting is typically done on a low speed (e.g. once per second) basis.

Components may be physically distributed throughout the overall system, so that the components are physically near the part of the system that they are monitoring and/or controlling. Power and communications between physically separated components are carried over a single, standardized cable assembly. Sensors and actuators are typically connected to the components using pre-made cable assemblies.

The modular, flexible system configuration allows for future expansion. New features can easily be added to a system without affecting the existing system. Distributed intelligence allows for localized monitoring and control which results in shorter, more reliable sensor and actuator cabling. Also, point-to-point wiring is generally eliminated through the use of pre-wired connector assemblies, which minimizes the possibility of improper or loose connections. Reusable components significantly reduce development effort over long term. Individual, function based components are typically less complex than a single, multi-function controller. This reduced complexity generally translates into more robust and reliable components that are easier to maintain.

Distributed intelligence and control allows for improved system reliability. The system may be able to continue operating at a reduced capacity, even if a portion of the system has failed. Separate, function based components allow for easier and faster field troubleshooting and maintenance. If a portion of the system has failed, it is likely that the cause can be easily compartmentalized into a specific functional block. An individual failed component can be replaced without the need to disassemble and rework the entire system.

A robust communication bus and messaging protocol for use in distributed monitoring and control systems. It is meant to be extremely flexible in regards to system expansion. Also, the messaging mechanisms are kept extremely simple such that the protocol can be implemented with minimal software and processing resources.

In the preferred embodiment, the physical communication layer is based on the CAN (Controller Area Network) high-speed standard (ISO 11898-2) operating at 125 kHz with termination resistance distributed within individual components throughout the system. Up to 64 nodes can be connected to communication bus. Each component generally has dual communication bus connectors (pass-thru connection) for daisy-chain wiring topology.

Each component within a system is given a unique Configuration ID. This Configuration ID consists of 3 elements: Component ID, Software Application ID, and Purpose ID. Component ID is unique to each (hardware) component. Software Application ID is unique to the end-product software development. Purpose ID is used as final differentiator between two or more components having the same Component ID and Software Application ID.

Each component within the system transmits periodic heartbeat messages consisting of their unique Configuration ID. This heartbeat information is used to maintain a system map of individual components within a system. Dropped/lost node can be detected by noting that a previously detected node has failed to broadcast a heartbeat message within a predetermined amount of time The data communication mechanism is based on the concept of a system-wide, distributed memory map. Individual elements within this memory structure are referred to as Distributed Variables. All functionality of this mechanism is handled through 2 different types of messages; Broadcast messages and Set-Point Request messages. They both contain 2 pieces of information; the address of a Distributed Variable within the system-wide memory map and a value for that Distributed Variable. The data content of each Distributed Variable is determined during product development and can represent any type of information including, but not limited to: pressure, temperature, flow rate, speed, time, date, text/character strings, etc.

Broadcast messages are used to inform all components within a system of the actual, current value of a Distributed Variable. Individual components may choose to accept or ignore this message depending on whether the particular Distributed Variable is relevant to its own operation. Generally, individual components within the system will maintain a local copy of all relevant Distributed Variables and, on receiving a relevant Broadcast message, will transfer the value from the message to their local data store.

Set-Point Request messages are used to request a change in the value of a Distributed Variable. A component may choose to recognize this type of message for specific Distributed Variables by registering "ownership" of those variables. After registering ownership of a Distributed Variable, the component can react to a Set-Point Request message in any number of ways. For example, it could blindly accept or reject all change requests. Alternatively, it could validate the requested value against a range of acceptable values before accepting the change request. After a change request has been processed by an owner, it may choose to respond with Broadcast message informing the rest of the system of the new value (or reiterating the previous value if the request was rejected).

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

The instant invention aims to divide a fluid handling control system into a network of modular, intelligent components in order to improve system performance (e.g. capability, flexibility, reliability, maintenance) and to reduce long-term development effort.

A fluid handling control/monitoring system is divided into a network of modular, intelligent components. These individual components are generally specific to a certain function within the system and contain all the intelligence necessary to perform that function without external guidance. Examples of the different types of components include but are not limited to: human-machine interface (HMI), fluid control, heater control, motor control, field-bus communications and the like. While each type of board is specialized in function, it may control several items of the same nature. For instance, a heater control may be able to control several heaters on one system. Similarly, a fluid board may have the ability to receive input from more than one flow meter and then control fluid flow of more than one point. An example might be a plural component metering and dispensing system where two fluid components have to be combined in a precise mix ratio.

Thus, all of the high speed control takes place on the board and only lower speed functions are performed over the network. In such a plural component system, the operator might set a desired mix ratio (2:1, etc.) on the HMI module. The actual control is "owned" by the fluid module so the fluid module would take the desired ratio setpoint and attempt to control the actual ratio to the desired result. The fluid module might have a number of other variables which it owns as well such as the flow rate of component A, flow rate of component B and potentially other useful pieces of data. One or more of those variables can be broadcast for use by other modules in the network but such broadcasting is typically done on a low speed (e.g. once per second) basis.

Figure 1:
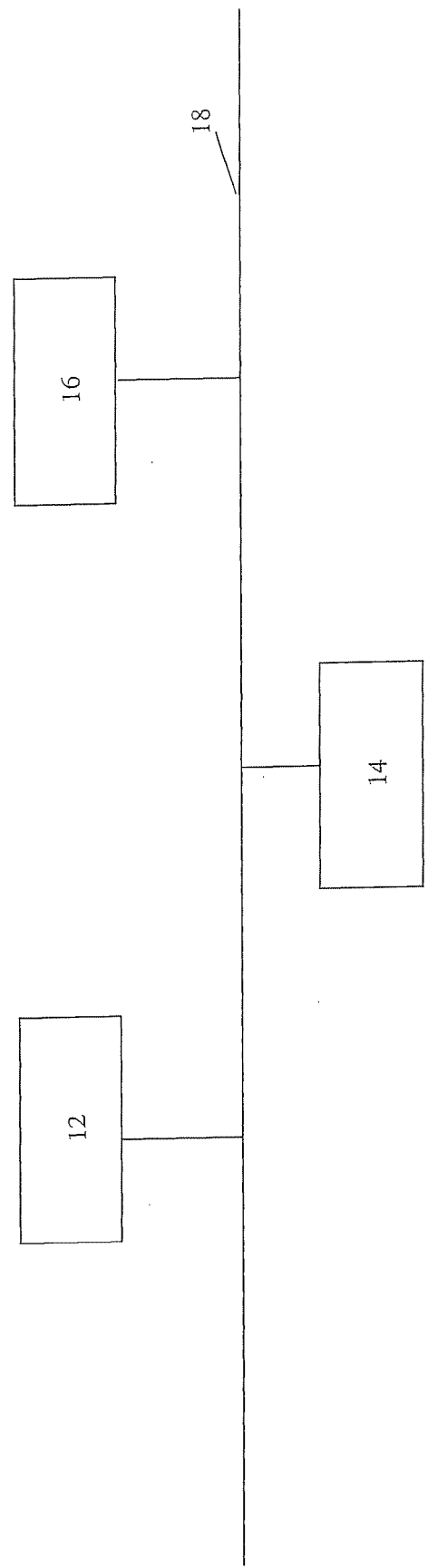
FIG. 1 is a schematic of a multi-module system having HMI, fluid control and heater modules.
Figure 2:
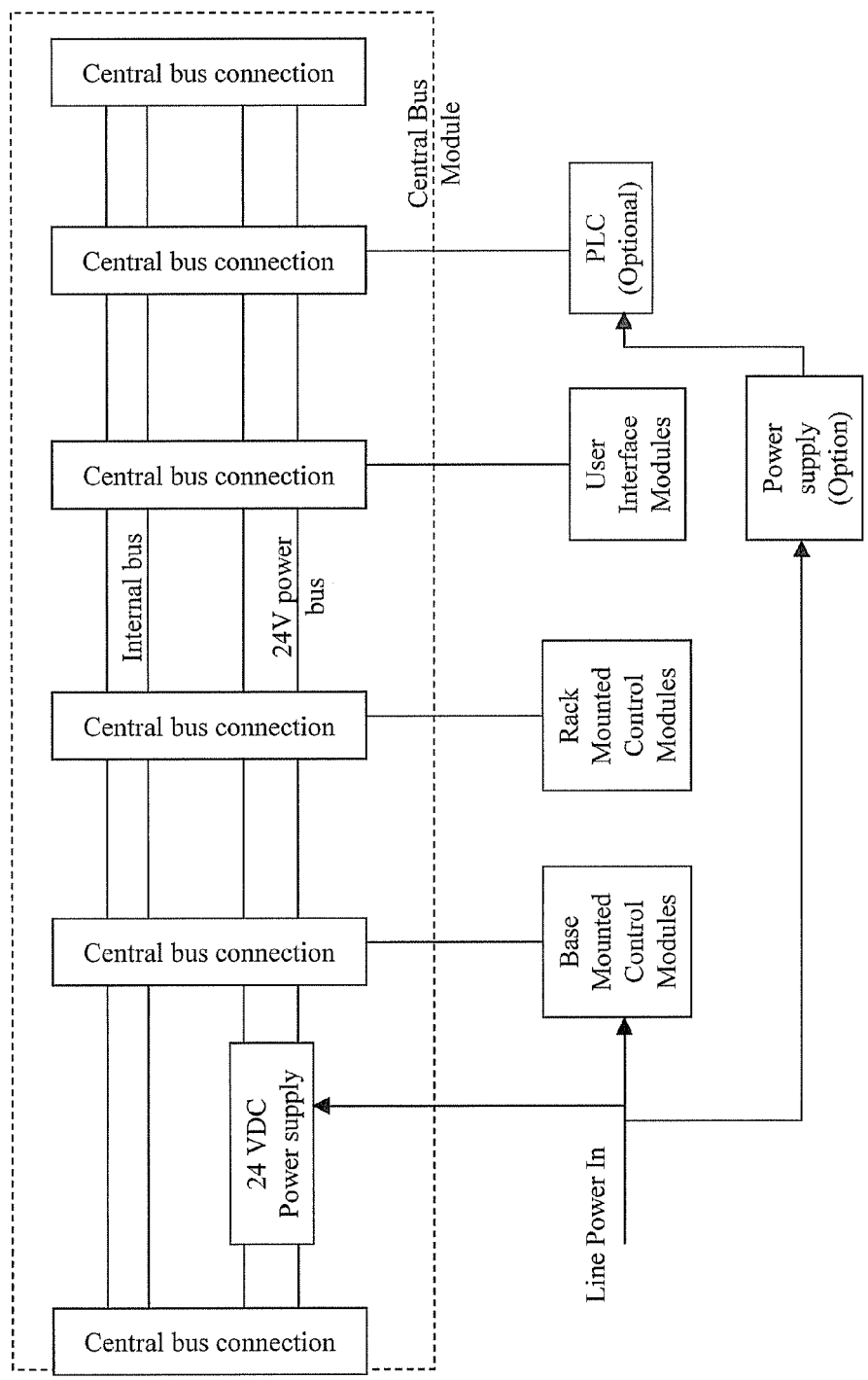
FIG. 2 is a schematic of the basic architecture.
Figure 3:
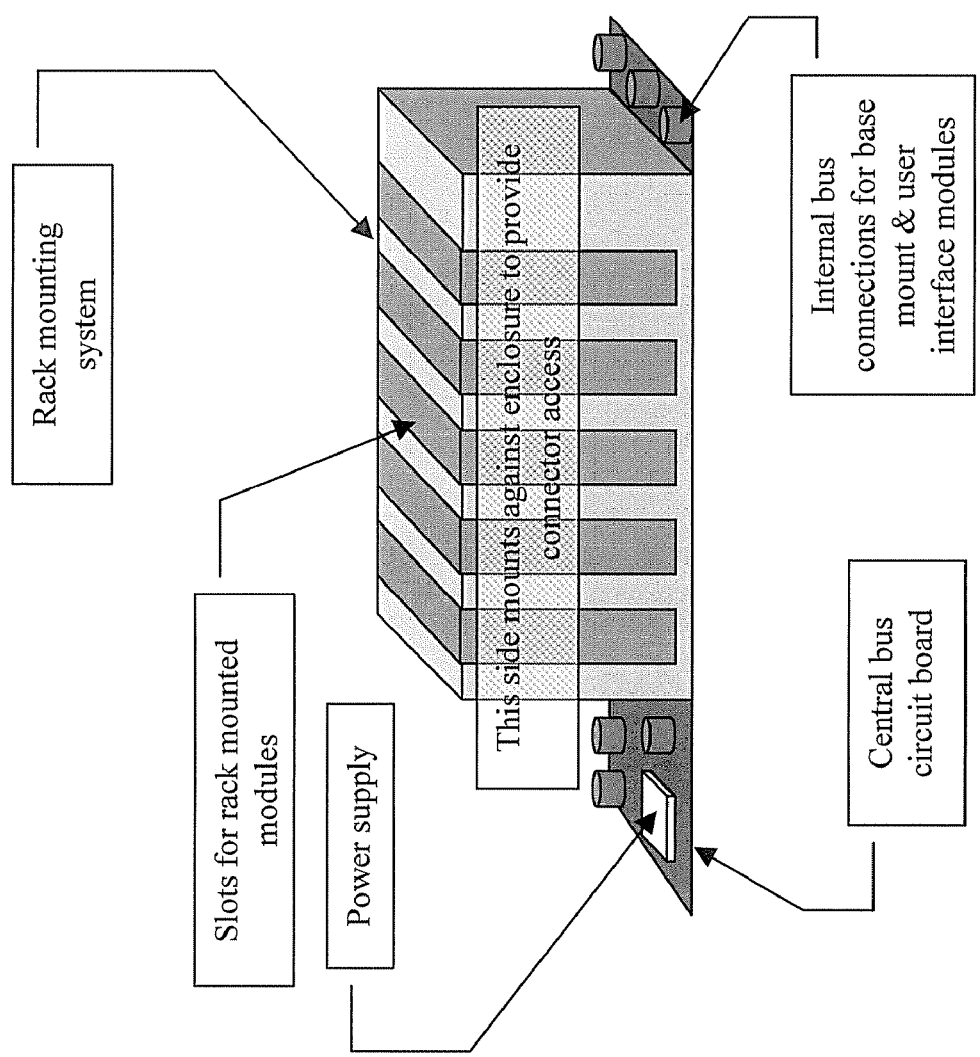
FIG. 3 shows the central bus and rack system.
Figures 4A, 4B:
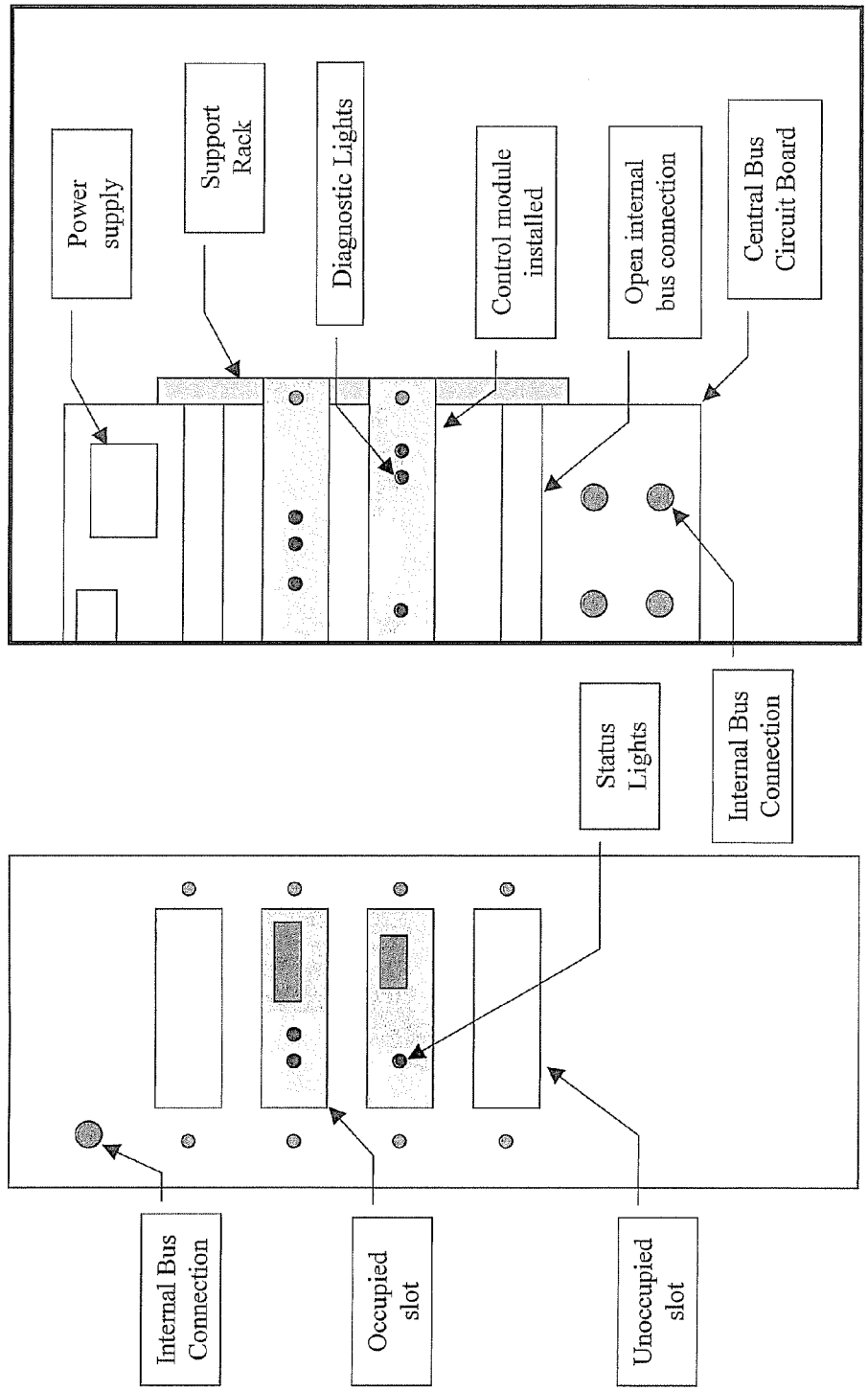
FIGS. 4a and 4b show outside and inside views of the central rack system.

A typical multi-module system 10 is shown in FIG. 1 and is comprised of an HMI module 12, a fluid module 14 and a heater control module 16, all connected to a CAN bus 18. The HMI module 12 may have provision for setting the desired temperatures of the various areas to be controlled along with a desired mix ratio for a plural component system. It may also have provision to have a readout of the actual values being controlled. The set points are broadcast on the network and received and acted upon by the appropriate ID module. For instance the heater for component A is desired to be at 100° C. so heater module 16 attempts to control to that level and broadcasts the actual value over the network whereby the HMI module 12 may display it to the operator. Note that the various modules may be widely separated with, for instance, the heater module 16 being in the fluid storage area, the fluid module 14 being near the point of application and the HMI module 12 being in a control room.

While for more complex systems, multiple modules will be use, for certain applications, standalone modules (local control monitors) can be effectively utilized with the network capability being used mainly for monitoring and record-keeping. Examples of such local control monitors 20 may be a pump controller which serves to monitor the amount of fluid pumped (by counting strokes) as well a monitoring for possible runaway. A module can also be used for batch control, that is, dispensing a desired amount of material. Such a module would have a simple method of inputting the desired dispense volume along with a simple display. The desired and actual volumes would also be broadcast for use elsewhere. Other examples of local control monitors include volume verification, ratio monitoring, tank level monitor (both single tank continuous analog level sensing and discrete level sensing), dispense Control for RIM and for precision valve dispense.

The modular, flexible system configuration allows for future expansion. New features can easily be added to a system without affecting the existing system. Distributed intelligence allows for localized monitoring and control which results in shorter, more reliable sensor and actuator cabling. Also, point-to-point wiring is generally eliminated through the use of pre-wired connector assemblies, which minimizes the possibility of improper or loose connections. Reusable components significantly reduce development effort over long term. Individual, function based components are typically less complex than a single, multi-function controller. This reduced complexity generally translates into more robust and reliable components that are easier to maintain.

Distributed intelligence and control allows for improved system reliability. The system may be able to continue operating at a reduced capacity, even if a portion of the system has failed. Separate, function based components allow for easier and faster field troubleshooting and maintenance. If a portion of the system has failed, it is likely that the cause can be easily compartmentalized into a specific functional block. An individual failed component can be replaced without the need to disassemble and rework the entire system.

A robust communication bus and messaging protocol for use in distributed monitoring and control systems. It is meant to be extremely flexible in regards to system expansion. Also, the messaging mechanisms are kept extremely simple such that the protocol can be implemented with minimal software and processing resources.

In the preferred embodiment, the physical communication layer is based on the CAN (Controller Area Network) high-speed standard (ISO 11898-2) operating at 125 kHz with termination resistance distributed within individual components throughout the system. Up to 64 nodes can be connected to communication bus. Each component generally has dual communication bus connectors (pass-thru connection) for daisy-chain wiring topology. Of course other network types can be utilized such as TCP/IP using Ethernet, WiFi or the like.

Each component within a system is given a unique Configuration ID. This Configuration ID consists of 3 elements: Component ID, Software Application ID, and Purpose ID. Component ID is unique to each (hardware) component. Software Application ID is unique to the end-product software development. Purpose ID is used as final differentiator between two or more components having the same Component ID and Software Application ID.

Each component within the system transmits periodic heartbeat messages consisting of their unique Configuration ID. This heartbeat information is used to maintain a system map of individual components within a system. Dropped/lost node can be detected by noting that a previously detected node has failed to broadcast a heartbeat message within a predetermined amount of time The data communication mechanism is based on the concept of a system-wide, distributed memory map. Individual elements within this memory structure are referred to as Distributed Variables. All functionality of this mechanism is handled through 2 different types of messages; Broadcast messages and Set-Point Request messages. They both contain 2 pieces of information; the address of a Distributed Variable within the system-wide memory map and a value for that Distributed Variable. The data content of each Distributed Variable is determined during product development and can represent any type of information including, but not limited to: pressure, temperature, flow rate, speed, time, date, text/character strings, etc.

Broadcast messages are used to inform all components within a system of the actual, current value of a Distributed Variable. Individual components may choose to accept or ignore this message depending on whether the particular Distributed Variable is relevant to its own operation. Generally, individual components within the system will maintain a local copy of all relevant Distributed Variables and, on receiving a relevant Broadcast message, will transfer the value from the message to their local data store.

Set-Point Request messages are used to request a change in the value of a Distributed Variable. A component may choose to recognize this type of message for specific Distributed Variables by registering "ownership" of those variables. After registering ownership of a Distributed Variable, the component can react to a Set-Point Request message in any number of ways. For example, it could blindly accept or reject all change requests. Alternatively, it could validate the requested value against a range of acceptable values before accepting the change request. After a change request has been processed by an owner, it may choose to respond with Broadcast message informing the rest of the system of the new value (or reiterating the previous value if the request was rejected).

It is contemplated that various changes and modifications may be made to the monitoring and control system without departing from the spirit and scope of the invention as defined by the following claims.

The invention claimed is:

1. A fluid monitoring and control system comprising a network of a plurality of modular components having different functions and a system-wide distributed memory storing distributed variables, wherein each modular component performs the respective function of said modular component without external guidance and wherein at least one first modular component comprises:

means for measuring a variable to be controlled;
means for controlling the variable to be controlled; and
means for broadcasting the value of said controlled variable over the network wherein the fluid monitoring and control system uses a broadcast message to inform all said modular components within the system of the current value of a distributed variable, said broadcast message comprising an address for the distributed variable within the system-wide distributed memory and a value for the distributed variable; and wherein the fluid monitoring and control system uses a set-point request message to request a change in the value of a distributed variable, said set-point request message comprising an address for the distributed variable within the system-wide distributed memory and a value for the distributed variable.

2. A fluid monitoring and control system according to claim 1, wherein a said modular component controls several items of the same nature.

3. A fluid monitoring and control system according to claim 1, wherein the at least one first modular component is a fluid control module, the system further comprising an interface module as a second modular component and a heater control module as a third modular component, all of the first to third modular components being connected to a bus.

4. A fluid monitoring and control system according to claim 1, further comprising at least one interface module comprising means for displaying at least one said controlled variable.

5. A fluid monitoring and control system according to claim 3, wherein the interface module further comprises means for inputting a set-point for a variable to be controlled.

6. A fluid monitoring and control system according to claim 3, wherein at least one modular component is a stand-alone module comprising means for broadcasting the value of a monitored variable over the network.

7. A fluid monitoring and control system according to claim 6, wherein the stand-alone module is one of a pump controller, a batch controller, a volume verification monitor, a ratio monitor, a tank level monitor and a dispense control monitor.

8. A fluid monitoring and control system according to claim 1, wherein each said component comprises a unique configuration ID.

9. A fluid monitoring and control system according to claim 8, wherein each configuration ID comprises a component ID, a software application ID and a purpose ID.

10. A fluid monitoring and control system according to claim 8, wherein each modular component transmits periodic heartbeat messages consisting of the unique configuration ID of said modular component.

11. A fluid monitoring and control system according to claim 3, wherein the distributed variables comprise at least one of pressure, temperature, flow rate, speed, time and date information.

* * * * *